United States Patent [19]
Hwa

[11] 3,711,576
[45] Jan. 16, 1973

[54] POLYMERCAPTAN MODIFIED VINYL HALIDE POLYMERS AND BLENDS THEREOF WITH VINYL HALIDE POLYMER

[75] Inventor: Jesse C. H. Hwa, Stamford, Conn.

[73] Assignee: Stauffer Chemical Company, New York, N.Y.

[22] Filed: Oct. 28, 1970

[21] Appl. No.: 84,922

Related U.S. Application Data

[62] Division of Ser. No. 664,903, Sept. 1, 1967, abandoned.

[52] U.S. Cl. ..........260/899, 117/132 C, 260/32.8 R, 260/79, 260/897 C, 260/898
[51] Int. Cl. ..........................C08f 29/24, C08f 29/22
[58] Field of Search ..........260/899, 79, 87.7, 92.8 R, 260/92.8 W

[56] References Cited

UNITED STATES PATENTS 3,364,182  1/1968  Griffith...................................260/79

3,219,588  11/1965  La Combe et al....................252/426

Primary Examiner—Murray Tillman
Assistant Examiner—C. Seccuro
Attorney—Robert C. Sullivan et al.

[57] ABSTRACT

Vinyl halide polymers which exhibit improved processing characteristics without sacrificing physical properties are prepared by polymerizing vinyl halide monomer in the presence of an aliphatic polymercaptan having at least three mercaptan groups in an amount based on —SH equivalence of from about 0.00015 to about 0.05 equivalence —SH per mole of monomeric material. The monomer is preferably 100 percent vinyl chloride though mixtures containing a predominant amount of vinyl chloride with minor amounts of other ethylenically unsaturated monomers can also be used.

13 Claims, No Drawings

POLYMERCAPTAN MODIFIED VINYL HALIDE POLYMERS AND BLENDS THEREOF WITH VINYL HALIDE POLYMER

Cross Reference To Related application

This application is a division of application Ser. No. 664,903, filed Sept. 1, 1967, now abandoned and refiled as Ser. No. 84,470.

The present invention is directed to a process for preparing vinyl halide polymers which exhibit improved processing characteristics without sacrificing physical properties. Particularly, the present invention relates to vinyl halide polymers prepared by polymerizing a monomer composition which is predominantly vinyl halide in the presence of an aliphatic polymercaptan compound having at least three mercaptan groups in an amount based on —SH equivalence of from about 0.00015 to about 0.05 equivalence —SH per mole of monomer in the monomer composition material. As used herein, the term "per mole of monomer in the monomer composition" is intended to be based on the additive total of the number of moles or fractions thereof of each monomer in the monomer composition used in preparing the polymer. The term "—SH equivalence" is intended to be based on the number of functional mercaptan groups present in the polymercaptan compound. Equivalence is computed by the following formula:

$$\frac{\text{Number—SH groups/compound}}{\text{Molecular weight of compound}} \times \frac{\text{Amount of compound used}}{\text{in grams/mole of monomer}} = \text{equivalence}$$

Polymers formed by the addition polymerization of vinyl halide monomers, such as vinyl chloride, have gained considerable commercial importance because of the low cost of the prepared polymer in addition to many desirable physical properties, such as hardness, clarity and inertness to chemicals. While polyvinyl chloride has many advantages, the polymer has the disadvantage of lacking stability toward heat and light. Heat causes the degradation of the polymer, apparently by the release of hydrochloric acid to form double bonds on the polymer chain which are then sites for cross-linking. Free radicals are also formed in the dehydrohalogenation reaction and, in the presence of oxygen, peroxide groups are also formed. The total effect is to cause the polymer to blacken in color and cross-link to an infusable and useless material. The thermal stability of the polymer is an important factor in that polyvinyl chloride is a thermoplastic polymer and therefore must be heated to the fluxing point in order to process the polymer into useable products. At the temperatures at which polyvinyl chloride begins to flow or flux so as to allow for processing by calendering, blow molding, or extruding, the polymer begins to degrade. An increase in processing temperature to allow for faster processing increases the degradation rate further. While the slight degree of degradation during processing is tolerated by processors, it is still considered a property which desirably should be eliminated.

Polyvinyl halide polymers also have the disadvantage that they are not easily soluble in solvents and therefore have limited use in the area of solution coatings, and if solution coatings are made the adherence of the coating to the coated substrate is generally poor. The use of another ethylenically unsaturated monomer, such as vinyl acetate in combination with the vinyl chloride, can generally provide a copolymer which has improved solution properties but this is accomplished at the sacrifice of the desirable physical property characteristics of the pure vinyl chloride type polymer.

It has now been unexpectedly found that vinyl halide polymers can be prepared which exhibit improved thermal stability and lower fluxing or flowing characteristics so as to allow for easier processing of the polymer without sacrificing physical properties.

It has also now been unexpectedly found that vinyl halide polymers having improved solvent solubility can be prepared and utilized as solution coating compositions which exhibit improved adhesion to a substrate without sacrificing the physical properties of the polyvinyl halide polymer.

In accordance with the present invention, there is provided a process for preparing vinyl halide polymers which exhibit improved processing characteristics and thermal stability without the loss of physical properties, which process comprises polymerizing in the presence of a free radical initiator an ethylenically unsaturated monomer composition containing a predominant amount of vinyl halide monomer of the formula:

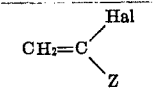

wherein Z is hydrogen or halogen and Hal means halogen, the term halogen as used herein including fluorine, chlorine, bromine and iodine, in the presence of an aliphatic polymercaptan compound having at least three mercaptan groups in an amount based on —SH equivalents of from about 0.00015 to about 0.05 equivalence —SH per mole of monomer in the monomer composition. Surprisingly, the polymers formed are thermoplastic polymers of high molecular weight which are characterized by physical properties commensurate with polymers of equal molecular weight formulated by polymerization in the absence of the polymercaptan material with the additional advantage that the fluxing temperature of the polymers is decreased so as to provide improved processing characteristics and also the thermal stability of the polymer is increased over a polymer of comparable molecular weight. The decrease in fluxing temperature allows for the processing of the polymer under thermal conditions which are less conducive to degradation without the sacrifice of physical properties which the polymer is capable of providing.

The exact chemical nature of the polymer which is formed by the process of the present invention is not known. The polymercaptan is chemically reacted into the polymer during polymerization. In theory, it is believed that the polymercaptan in some way chemically modifies the polymeric structure, possibly by the formation of a more highly branched polymer than one prepared in the absence of the polymercaptan. Because of the amount used, the unexpected results cannot be explained on the basis of a physical admixture wherein the polymercaptan exhibits some plasticizing effect. Also, the thermal stabilizing effect cannot be explained on the basis of a physical admixture of the polymercaptan with the polymer as analytical experiments fail to show the presence of any free mercaptan groups in the polymer product. The foregoing is theory and applicant is not intended to be bound thereby.

The vinyl halide monomers included within the formula given above that can be used in the present invention include, for example, vinyl fluoride, vinyl chloride, vinyl bromide, vinyl iodide, vinylidene fluoride, vinylidene chloride, vinylidene bromide, vinylidene iodide and the like, though vinyl chloride is preferred. The formula is intended to include all $\alpha$-halo-substituted ethylenically unsaturated materials which are included within the limits of the formula and which are capable of entering into an addition polymerization reaction. The polymers of the present invention can be formed of the same or different monomer materials falling within the formula and, thus, the invention is intended to cover homopolymers, copolymers, terpolymers, and interpolymers formed by the addition polymerization of the materials falling within the formula. Illustrative of these copolymers is a copolymer of vinyl chloride and vinylidene chloride. The term vinyl halide as used in the claims is intended to include both homo and copolymers of compounds falling within the given formula.

While it is preferred that the monomer composition be comprised totally of vinyl halide monomer, the present invention is also intended to include copolymers formed by the free radical addition polymerization of a monomer composition containing a predominant amount, e.g., at least 50 percent of vinyl halide and a minor amount, e.g., up to 50 percent by weight of another ethylenically unsaturated monomer material copolymerizable therewith. Preferably, the other ethylenically unsaturated monomer material is used in amounts of less than 25 percent by weight and more preferably in amounts less than 10 percent by weight of the total monomer materials used in preparing the polymer. Suitable ethylenically unsaturated monomer materials which can be used are those which can be copolymerized with the vinyl halide monomer and which do not have reactive groups which would interfere with the reactive nature of the mercaptan group and prevent the mercaptan from performing its chemical function in the reaction mixture so as to provide the desired final product. Illustrative of suitable material which can be used to form copolymers, terpolymers, interpolymers and the like are the following: monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear or alpha-alkyl or aryl substituted derivatives, e.g., o-, m- or p-methyl, ethyl, propyl or butyl styrene; alphamethyl, ethyl, propyl or butyl styrene; phenyl styrene; and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates; alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyethyl and tertiary butylamino acrylates; isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropripionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alpha-bromoacrylate, ethyl alpha-bromoacrylate, methyl alpha-fluoracrylate, ethyl alpha-fluoracrylate, methyl alpha-iodoacrylate and ethyl alpha-iodoacrylate; alkyl alpha-cyanoacrylates, e.g., methyl alpha-cyanoacrylate and ethyl alpha-cyanoacrylate; maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl $\beta$-chloroethyl sulfide, vinyl $\beta$-ethoxyethyl sulfide and the like can also be included. Diolefinically unsaturated hydrocarbons containing two olefinic groups in conjugated relation and the halogen derivatives thereof, e.g., butadiene-1,3; 2-methyl-butadiene-1,3; 2,3-dimethyl-butadiene-1,3; 2-chloro-butadiene-1,3; 2,3-dichloro-butadiene-1,3; and 2-bromo-butadiene-1,3 and the like.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed from pure vinyl halide monomer and most preferably pure vinyl chloride.

The free radical polymerization of the monomer composition is conducted in the presence of an aliphatic polymercaptan having at least three mercaptan groups per molecule and is present in an amount based on —SH equivalence of from about 0.00015 to about 0.05 equivalence —SH per mole of monomer in the monomer composition. The term aliphatic polymercaptan is intended to include any polymercaptan wherein the mercaptan group is attached to the remainder of the molecule by means of an aliphatic carbon atom, e.g., a non-aromatic carbon atom. This can be represented by the formula:

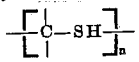

wherein the free bonds of the carbon atom can be attached to aliphatic, aromatic or inorganic moieties and $n$ is an integer of 3 and above. Thus, the polymercaptan includes aliphatic as well as aralkyl types. The polymercaptan compound can have a straight chain or branched chain molecular configuration. The compound can be symmetrical or unsymmetrical with regard to the —SH functionality. The mercaptan group can be attached to a primary, secondard or tertiary carbon atom. Other functional groups, for example, ester groups, ether groups, amide groups, hydroxy groups, and the like, may also be present provided that they do not interfere with the reactive nature of the mercaptan group and prevent the mercaptan group from performing its chemical function in the reaction mixture so as to provide the desired final product. The polymercaptan compound can also be a low molecular weight polymer having at least three pendant mercaptan groups per molecule. The molecular weight of the polymeric polymercaptan is desirable less than 3,000 for ease of use in the polymerization.

Illustrative of the various mercaptan containing moieties which moieties can comprise all or part of the mercaptan containing moieties which form the aliphatic polymercaptan compound for use in the present invention are:

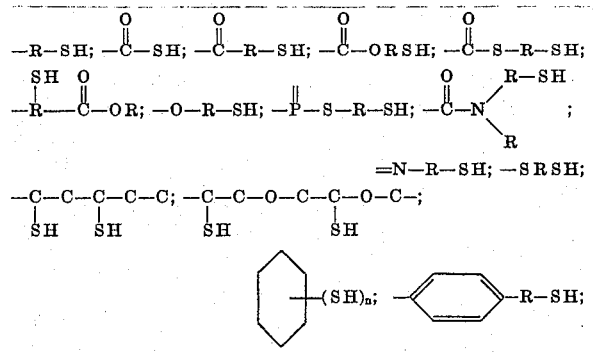

and the like wherein R is aliphatic and preferably an alkylene radical. These are given only as illustrative of the various mercaptan containing moieties which can be present either alone or in combination in the polymercaptan compound. Other moieties not specifically mentioned which are within the generic description of the polymercaptan are intended to be included within the scope of the present invention.

Any desired polymercaptan compound may be used alone or in admixture with other polymercaptan compounds with equal facility. Therefore, it is intended that the term "polymercaptan compound" as used herein include not only pure polymercaptan compounds but also admixtures of various polymercaptans.

The amount of polymercaptan compound used in the process of the present invention is based on the functional equivalency of the mercaptan groups per mole of monomer used in forming the final polymer. Polymers can be prepared in accordance with the present invention by utilizing quantities of a polymercaptan compound sufficient to provide an —SH equivalence of from about 0.00015 to about 0.05 equivalence —SH per mole of monomer used to form the final polymer. Equivalency is computed in accordance with the following formula:

$$\frac{\text{Number—SH groups/compound}}{\text{Molecular weight of compound}} \times \frac{\text{Amount of compound used}}{\text{in grams/mole of monomer}} = \text{equivalence}$$

The above formula can be used to directly compute the —SH equivalence of a single polymercaptan compound. The equivalence of admixtures of different polymercaptans are obtained by determining the equivalence for each polymercaptan using the above formula followed by adding the equivalence from each to obtain the total —SH equivalence of —SH groups present during the polymerization. Preferably, the —SH equivalence is maintained within the range of about 0.00015 to about 0.005, and more preferably within the range of about 0.0003 to about 0.002 —SH equivalence per mole of monomer.

Suitable polymercaptan materials can be illustrated by pentaerythritol tri(7-mercaptoheptanoate), pentaerythritol tetra(7-mercaptoheptanoate), mercaptoacetic acid triglyceride, pentaerythritol tri(beta-mercaptopropionate), pentaerythritol tetra(beta-mercaptopropionate), cellulose tri(alpha-mercaptoacetate), 1,2,3-propane-trithiol, 1,2,3,4-neopentane-tetrathiol, 1,2,3,4,5,6-mercaptopoly(ethylneoxyethyl)sorbitol), 1,1,1-trimethyl propane tri(alpha-mercaptoacetate), dipentaerythritol hexa(3-mercaptopropionate), 1,2,3-tris(alpha-mercaptoacetyl) propane, thiopentaerythritol tetra(alhpa-mercaptoacetate), 1,6,10-trimercaptocyclododecane,1,2,3,4,5,6-hexamercaptocyclohexane, N,N', N'',N'''-tetra(2-mercaptoethyl)pyromellitamide, tri-(2-mercaptoethyl)nitrilotriacetate, pentaerythritol tri(alpha-mercaptoacetate), pentaerythritol tetra(alpha-mercaptoacetate), tri(p-mercaptomethylphenyl)methane, 2,2,7,7-tetrakis(mercaptomethyl)-4,5 dimercaptooctane, 5,5,5-tri(mercaptoethyl)phosphorotrithioate, xylitol penta (beta-mercaptopropionate), and the like.

Illustrative of low molecular weight polymeric materials having at least three pendant mercaptan groups per molecule are homopolymers and copolymers of vinyl thiol, e.g., polyvinyl thiol. Other polymeric thiols, such as glycerol/ethylene glycol polyether polymercaptan can also be used.

It is preferred to use low molecular weight monomeric materials having from three to five mercaptan groups per molecule as illustrated by pentaerythritol tetrathioglycolate, pentaerythritol tetra(3-mercaptopropionate), trimethylolethane tri(3-mercaptopropionate), xylitol penta(beta-mercaptopropionate) trimethylolethane trithioglycolate, trimethylolpropane tri(3-mercaptopropionate) and trimethylolpropane trithioglycolate.

The foregoing materials are given as illustrative of polymercaptan compounds having three to five mercaptan groups per molecule. It is intended that the above compounds are illustrative of and not limited to the various compounds within the preferred group of polymercaptans having from three to five mercaptan groups per molecule.

The free radical polymerication can, in accordance with the method of the present invention, be accomplished using mass, suspension, emulsion or solution techniques, though the use of the suspension technique is preferred. The various additives and conditions as used in such polymerication procedures are also useable in the operation of the method of the present invention. Variation of conditions of reaction depending on the type of monomer composition, catalyst or initiator system and type of procedure are within the purview of a skilled artisan.

Mass or bulk polymerization is initially a single phase reaction comprising the monomer and a monomer soluble catalyst or initiator. Preferably, and in the practice of the method of the present invention, a polymer-captan, such as 1,2,3-propanetrithiol, which is soluble in the monomer phase is used. Since mass polymerizations are highly exothermic, the reaction mixture should be vigorously agitated during the polymerization reaction to assist in heat dissipation so as to prevent the polymerization reaction from "running away". Mass polymerization generally is conducted in the absence of any additives other than a free-radical initiator and hence is advantageous for the preparation of polymers having a minimum degree of contamination.

Suspension polymerization refers to the polymerization of monomer dispersed in a suspension medium which is a non-solvent for both the monomer and the polymer, generally water, utilizing, normally, a monomer soluble initiator. Suspension polymerization is similar to mass polymerization in that polymerization takes place within a monomer phase containing a monomer soluble initiator. However, the use of the suspension medium assists in the dissipation of the heat or reaction and therefore the polymerization reaction is easier to control. Suspension polymerization is generally accomplished by dispersing the monomer in the suspending medium either by constant agitation, by use of a suspending agent, preferably both. Various suspending agents such as gelatin, hydroxymethyl cellulose, hydroxyethyl cellulose, hydroxypropyl cellulose, carboxymethyl cellulose, talc, clay, polyvinyl alcohol and the like can be used in the suspension polymerization of vinyl halide and these agents can be used in the method of the present invention. Other suspending agents which are known to be useful in the suspension polymerization of vinyl halides can also be used. The type and amount of the suspending agent used has, as is known, some influence on the particle size of the finally obtained product. The exact amounts of suspending agent and type can be selected by the skilled artisan so as to provide the particle size of product desired. Various other additives, such as thermal stabilizers, and the like, which are normally utilized in the polymerization can also be included. Suspension polymerization techniques are generally preferred in that the polymerization is easier to conduct and the product obtained has a particle size which is more easily handled and used by polymer processors.

Emulsion polymerization refers to the polymerization of a monomer dispersed in an aqueous medium utilizing a water soluble catalyst or initiator and an emulsifying agent to maintain the monomer in its emulsified form. Emulsion polymerization differs from suspension polymerization in that the initiator in the emulsion polymerization is generally within the aqueous phase whereas the initiator in the suspension polymerization is generally within the monomer phase.

In theory, the kinetics of the two types of polymerization seem to proceed along entirely different lines. Another distinction is that the emulsion polymerization provides polymer particles within the range of 0.1 $\mu$ to 5 $\mu$ whereas the suspension polymerization provides much larger particles of product within the range of 10 $\mu$ to 1,000 $\mu$. Various emulsifying agents such as sodium lauryl sulfate, potassium stearate, alkyl benzene sulfonate, ammonium dialkyl sulfosuccinate are known for use in polymerizing vinyl halides by emulsion techniques and can be used in the practice of the present invention. Other emulsifying agents which are also known to be useful in emulsion polymerization of vinyl halides can also be used. The exact amounts of the emulsifying agent and a type which is used are easily determined by the skilled artisan. In general, any of the additives such as catalysts and stabilizers, which are normally used in emulsion polymerization of vinyl halides can be utilized in the practice of the present invention. The product obtained from the emulsion polymerization which is in the form of a latex can be utilized per se or the latex can be coagulated to precipitate the polymer particles which can then be dried and processed into any desired form by polymer processor.

Solution polymerization is a process which requires the use of an inert liquid which is a solvent for the monomeric compounds used in forming the polymer which solvent may or may not be a solvent for the prepared polymer. The catalyst or initiators, if used, are of the same types as those used in the mass polymerization reaction. Solution polymerization has the advantage that the solvent, as in suspension polymerization, assists in the dissipation of the heat of reaction. The average molecular weight of polymers prepared by the use of solution polymerization techniques are generally lower than those obtained by the use of other polymerization techniques and this method can be effective in the production of low molecular weight vinyl halide polymers. In general, any of the additives such as catalysts and stabilizers which are normally used in solution polymerization of vinyl halides can be utilized in the practice of the present invention. The polymer is usually separated from the solvent and the solvent is recycled so as to make the process more economical. The solvents which are used in solution polymerization can be those in which only the monomer is soluble and those in which both the monomer and resulting polymer are soluble, the former solvents being preferred. Illustrative of the monomer soluble, polymer insoluble solvents which can be used in the performance of a solution polymerization of vinyl halides are: pentane, hexane, benzene, toluene and cyclohexane. Illustrative of monomer-polymer solvents which can be used in the solution polymerization of vinyl halides are: cyclohexanone, tetrahydrofuran, dimethyl sulfoxide, and dimethyl formamide. A mixture of solvents can also be used to reduce cost, e.g., as by the use of an expensive solvent diluted with an inexpensive non-solvent or weak solvent. Illustrative of solvent mixtures are: tetrahydrofuran and toluene or petroleum ether. The foregoing solvents and mixtures are given as illustrative and are in no way intended to be inclusive of all the possible solvents and mixtures thereof which can be utilized.

The polymerization of the vinyl halide monomers is a free-radical polymerization reaction and should be conducted in the presence of a free-radical initiator. Useful free-radical initiators are organic or inorganic peroxides, persulfates, ozonides, hydroperoxides, peracids and percabonates, azo compounds, diazonium salts, diazotates, peroxysulfonates, trialkyl borane-oxygen systems, and amine oxides. Azodiisobutyronitrile is particularly useful in the present invention. The catalyst is used in concentrations ranging from about 0.01 to about 1.0 percent by weight based on the total weight of the monomers. For use in mass, suspension, and solution polymerization, the catalysts which are soluble in the organic phase, such as benzoyl peroxide, diacetyl peroxide, azobisisobutyronitrile or diisopropyl peroxydicarbonate, azobis ($\alpha$-methyl-$\gamma$-carboxybutyronitrile), caprylyl peroxide, lauroyl peroxide, azobisisobutyramidine hydrochloride, $\tau$-butyl peroxypivalate, 2,4-dichlorobenzoyl peroxide, azobis($\alpha$-$\gamma$-dimethylvaleronitrile) are generally used. For use in emulsion polymerization, water soluble catalysts such as ammonium persulfate, hydrogen peroxide are used. Preferably, the initiator which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g., pinking. Other known free radical initiating catalysts, such as light illumination or irradiation with gamma-ray can also be used. Catalysts which tend to cause ionic or coordination polymerization such as the Ziegler-type catalysts can be used in the present invention if organic solvents are used as the reaction medium.

The polymerization of the monomers is conducted at temperatures varying between −80°C. to about 120°C. for varying periods of time depending on the type of monomers utilized and the polymerization technique employed. The choice of a specific reaction temperature is dependent to a large extent on the initiator which is utilized and the rate of polymerization which is desired. Generally, for suspension polymerizations, temperatures of about 40°C. to 70°C. in the presence of an azo type initiator have been found to be effective.

It has also been found that the relative viscosity of the polymer can be affected by temperature. As the temperature increases, the relative viscosity of the polymer decreases. In theory, as the temperature increases so does the polymerization rate and therefore, the polymer tends to be more highly branched and have shorter polymer chains. It has been further found that the relative viscosity of the polymer is dependent on temperature and concentration of polymercaptan. Thus, by varying both temperature and concentration of polymercaptan, polymers of varying relative viscosities can be obtained and this provides greater latitude in the choice of polymerization conditions.

The time necessary for conducting a polymerization reaction again depends on the type of monomer, the temperature, and the type of initiator which are chosen. The amount of time necessary to effect a completion of a polymerization reaction is well within the purview of a skilled artisan following his choice of monomer initiator and polymerization system.

In any of the foregoing polymerization procedures, any other additives which are now commonly utilized can be included within the polymerization mixture. Other procedures such as short-stopping the polymerization at a desired point can also be utilized in accordance with the present invention.

The polymerization products of the present invention can be admixed with various conventional inert additives such as fillers, dyes, and pigments. Also the polymerization products can be admixed with impact modifiers, plasticizers, lubricants, additional thermal stabilizers, and ultra-violet light stabilizers as desired.

The invention is further illustrated in the examples which follow

EXAMPLES

Suspension Polymerization Procedure

In Examples 1 to 10, the following suspension polymerization procedure is used unless otherwise indicated: The reaction mixture or charge is sealed in a 1 quart soda bottle, the bottle is immersed in a temperature controlled water bath, and the polymerization is conducted for 14 hours. The bottles are rotated end over end at 41 revolutions per minute in the bath to provide agitation. Conversion is usually about 95 percent to about 100 percent. The charge consists of the following materials in amounts given in approximate parts by weight:

| Charge | Parts by Weight (Dry) |
|---|---|
| Vinyl Chloride | 100 |
| Deionized Water | 230 |
| Polymercaptan [1] | See Table I |
| Suspending Agent [2] | 0.167 |
| Initiator [3] | 0.067 |

[1] Parts by weight of a commercially available blend of polymercaptans containing: 35% Pentaerythritol tetra(3-mercaptopropionate) 35% Pentaerythritol tri(3-mercaptopropionate)
[2] Hydroxymethylcellulose
[3] Azobisisobutyronitrile

TABLE I

| | Polymercaptan | | Reaction temperature and relative viscosity | | | |
|---|---|---|---|---|---|---|
| | Parts by weight | —SH equivalence per mole of monomer | A 44° C. | B 47° C. | C 51° C. | D 60° C. |
| Example | | | | | | |
| 1 | 0.0 | 0.0 | 2.79 | 2.58 | | 2.03 |
| 2 | 0.1 | 0.00035 | 2.29 | 2.26 | | 1.83 |
| 3 | 0.2 | 0.00069 | 2.05 | 2.01 | 1.91 | 1.71 |
| 4 | 0.3 | 0.00103 | 1.89 | 1.85 | 1.80 | 1.60 |
| 5 | 0.4 | 0.00138 | 1.82 | 1.79 | 1.72 | |
| 6 | 0.5 | 0.00172 | | 1.75 | | 1.58 |

The polymerization procedure set forth above operates equally as well to provide the desired final product when other suspending agents, e.g., gelatin, polyvinyl alcohol, hydroxypropyl cellulose, carboxymethyl cellulose, hydroxyethyl cellulose, talc and clay, are used in place of the hydroxymethyl cellulose. Similarly, the azobisisobutyronitrile initiator can be replaced by lauroyl peroxide, diisopropylperoxy dicarbonate, or t-butyl peroxypivalate initiators.

The approximation of actual processing conditions and the determination of the processability of a polymer can be done in a laboratory by means of a fusion torque rheometer. The polymer in powdered form is placed in the instrument and is fused under the influence of heat and shear. The instrument, which is basically in dynamometer, measures the torque force required to maintain mixer rotors revolving at a constant speed while the polymer is being fused. The instrument comprises a heated rotor cavity of measured size having rotors of the Banbury mixer type mounted therein. The rotors are driven by an electric motor suspended between two bearing blocks through which extends the main shaft of the motor. A weighted balance bar is attached to the motor to compensate for the torque force required in operating the rotors. Attached to the balance bar is a weight measuring device which can be read visually and which is provided with a scribe for recording measured weights on a sheet of recording paper. A tachometer and control circuit is used to maintain the number of revolutions of the rotors constant. A circulatory oil temperature control system is used to control the temperature within the rotor cavity. The test comprises inserting a measured amount of polymer in powdered form into the rotor cavity and measuring the resistance torque on the rotors developed by the sample as it begins to melt. This resistance causes the electric motor to swing in a direction opposite the direction of shaft rotation. This swinging motion is transmitted by the balance bar to the weight measuring device which determines the number of meter-grams of reverse force necessary to offset the swinging motion and hence the torque being applied to the rotors. The torque generally rises from a low point when the sample of polymer is in powdered form to a high point at flux after which the torque subsides to an intermediate equilibrium point or equilibrium torque. The torque remains constant until the polymer degrades whereupon the torque increases due to polymer crosslinking. The equilibrium torque value determines the amount of work in meter-grams which must be applied to the polymer to process the same. The length of time the polymer remains at the equilibrium torque point before degrading is a measure of the thermal stability of the polymer. Another value indicative of stability is the rate of degradation as measured in meter-grams per minute. The faster the degradation, the less stable is the polymer. As used herein, polymers which degrade at a rate of from 0–25 meter-grams per minute are denoted as having failed non-catastrophically, 25 to 100 meter-grams per minute as semi-catastrophically and 100 meter-grams per minute and above as catastrophically. In the following Table II are reported values for fusion torque rheometer measurements made on the polymers of Examples 2D, 3D, 4C, 6D compared with the rheometer values of a control sample from Example 1D. Rheometer values for a medium molecular weight polyvinylchloride homopolymer and two low molecular weight homopolymers are also reported. The tests are conducted using a 60 cm³ sample bowl using Banbury type rotors adjusted to operate at 60 revolutions per minute at a temperature of 355° F. The test samples comprise 100 parts by weight of polymer, 3 parts by weight of a stabilizer (Thermolite 31 which is a sulfur-containing organotin compound manufactured by Metal & Thermit Corp., Rahway, N.J.) and 0.5 part by weight of a lubricant (calcium stearate). Values reported for fusion torque rheology are in meter-grams and are for equilibrium torque. The values for stability are the number of minutes that the polymer remains at the equilibrium point before degrading. Those with a plus indicate that the test was conducted for the given number of minutes and that no gross failure in physical properties due to degradation (blacking, etc.) of the polymer samples had occurred during that time. The type of failure results corresponds to the rate ranges given hereinbefore. The table also gives relative viscosity values and tensile strength values.

TABLE II

| Example | Parts polymer-captan | Relative viscosity | Equilibrium melt vis. in meter-grams | Stability at equilibrium melt in minutes | Type of failure | Tensile strength |
|---|---|---|---|---|---|---|
| 1D | 0.0 | 2.02 | 1,800 | 18 | Catastrophic | 7,700 |
| 2D | 0.1 | 1.82 | 1,500 | 30 | Non-catastrophic | |
| 3D | 0.2 | 1.72 | 1,320 | 100 | ___do___ | 8,000 |
| 4C | 0.3 | 1.71 | 1,170 | 60+ | ___do___ | 8,010 |
| 6D | 0.5 | 1.58 | 900 | 100+ | ___do___ | |
| Conventional polyvinyl chloride homopolymers: | | | | | | |
| Med. mol. wt | 0.0 | 2.12 | 2,220 | 29 | Catastrophic | 7,790 |
| Low mol. wt | 0.0 | 1.78 | 1,500 | 43 | Semi-catastrophic | 7,490 |
| Do | 0.0 | 1.61 | 1,260 | 33 | ___do___ | 7,440 |

NOTE.—Relative viscosity is measured at 30° C. using 1 gram of polymer dissolved in 100 grams of cyclohexanone in a Ubbelohde viscosimeter.

The polymers of the present invention also begin to fuse faster than conventional polyvinyl chloride homopolymer and they reach the equilibrium melt point in less time.

As can be seen from a comparison of the data in Table II, it can be seen that the polymers of the present invention have lower torque rheology values than the control prepared under similar conditions. Also, it can be seen that the torque rheology values for the polymers of the present invention are lower than conventional polyvinyl chloride homopolymers having approximately the same relative viscosity. These rheology values indicate that the polymers of the present invention require less work to process than comparable polyvinyl chloride homopolymers, e.g., more easily processable. Also, and since the equilibrium torque point is related to both temperature and shear, the polymers of the present invention can be processed at shear rates comparable to conventional polyvinyl chloride homopolymers of the same approximate relative viscosity but at a lower temperature. Either case provides an area of economic saving for the polymer processor.

Also, the table shows that the polymers of the present invention have much longer stability times as compared to the control and comparable medium and low molecular weight conventional polyvinyl chloride homopolymers. These longer stability times allow the processor more time to work the polymer and therefore make the limits of working time less critical.

The tensile strengths of the final products prepared from the listed polymers are, as can be seen in the table, substantially equal. This indicates that physical properties have not been sacrificed to obtain an easier processing polymer.

The polymers prepared in accordance with the present invention also exhibit increased solvent solubility and, when applied as solution coatings, are more adherent to the coated base. Also, solution coatings of the polymers of the present invention require less baking or drying to develop an adherent coating than comparable polymers not made in accordance with the invention.

The following are examples of the solvent solubility of a vinyl chloride polymer prepared in accordance with the method of Example 3D which has a relative viscosity of 1.66 (Polymer A) compared to a polyvinyl chloride homopolymer having a relative viscosity of 1.78 (Polymer B). Viscosities in centipoises are determined at 25° using a Brookfield viscosimeter 24 hours after the solutions are prepared.

EXAMPLE 7

15 grams of Polymer A are dissolved in 85 grams of cyclohexanone with stirring at room temperature. The procedure is repeated using Polymer B, e.g., the polyvinyl chloride homopolymer. The viscosities are shown in Table III.

EXAMPLE 8

10 grams of Polymer A are dissolved in 90 grams of methyl ethyl ketone with stirring at 60° C. the procedure is repeated using Polymer B, e.g., the polyvinyl chloride homopolymer. The viscosities are shown in Table III.

EXAMPLE 9

11 grams of Polymer A are dissolved in a mixture of 10 grams of cyclohexanone and 40 grams of methyl ethyl ketone at 60° C. with stirring. 50 grams of toluene are stirred in to form a clear solution. The procedure is repeated using Polymer B, e.g., the polyvinyl chloride homopolymer. The viscosities are shown in Table III.

TABLE III

| | Example 7 15% Solution in Cyclohexanone | Example 8 10% Solution in MEK | Example 9 11% Solution in Mixed Solvents |
|---|---|---|---|
| Polymer A Polymer of invention | 305 cps | 22 cps | 38 cps |
| Polymer B PVC Homopolymer | 395 cps | 33 cps | 104 cps |

Solutions in mixed solvents prepared in accordance with Example 9 are applied to metallic test panels using a 6 mil draw-down bar. The panels are then air dried for 15-20 seconds and then are dried for a controlled period of time in a recirculating air oven. Adhesion tests are then conducted to determine if the drying time is sufficient to provide an adherent film. Adhesion is determined on the coated panels 24 hours after removal from the oven using the cellophane tape test. In this test, the coating is cross-hatched with a sharp knife to the substrate, the lines being one-sixteenth inch apart. Cellophane tape is firmly pressed on the scored area and is rapidly pulled away from the coating. Ratings of the test are as follows:

| | |
|---|---|
| Excellent | No coating removed. |
| Good | Very slight coating removal at knife marks. |
| Fair | Some coating removal. |
| Poor | Considerable coating removal. |
| Very Poor | Total removal of coating. |

TABLE IV

| Temperature | Time | Polymer of Example 3D | PVC |
|---|---|---|---|
| Base 1. Aluminum coated with chromic phosphate and oxides at level of 8-12 mg./sq.ft. | | | |
| 425° F. | 15 sec. | VP | VP |
| 425° F. | 30 sec. | E | VP |
| 425° F. | 45 sec. | E | P |
| 425° F. | 60 sec. | E | P |
| Base 2. Aluminum coated with chromium oxide and aluminum oxide. | | | |
| 425° F. | 15 sec. | E | P |
| 425° F. | 30 sec. | E | E |
| 425° F. | 45 sec. | E | E |
| 425° F. | 60 sec. | E | E |
| Base 3. Steel coated with zinc phosphate having internal crystal refining agent at level of 150-275 mg./sq. ft. | | | |
| 425° F. | 15 sec. | VP | VP |
| 425° F. | 30 sec. | F-P | VP |
| 425° F. | 45 sec. | G | VP |
| 425° F. | 60 sec. | E | VP |
| Base 4. Steel coated with accelerated iron phosphate at levels of 50-120 mg./sq.ft. | | | |
| 425° F. | 15 sec. | P-F | P |
| 425° F. | 30 sec. | F-G | VP |
| 425° F. | 45 sec. | E | P-F |
| 425° F. | 60 sec. | E | P-F |
| Base 5. Electrolytic tin plate. | | | |
| 425° F. | 60 sec. | F-G | VP |
| 300° F. | 10 min. | E | E |
| Base 6. Cold rolled steel. | | | |
| 300° F. | 10 min. | E | P |

As the above data indicates, coatings applied from solutions containing the polymers prepared in accordance with the present invention require less drying time to develop excellent adhesion than coatings of comparable polyvinyl chloride homopolymer. Also, the polymers prepared in accordance with the invention allow for the preparation of more adherent coatings than those of a comparable polyvinyl chloride homopolymer.

The polymers of the present invention can also be advantageously used in blends with other polymer materials such as polyvinyl chloride homopolymers. The polymercaptan modified polymers of the invention provide a blended polymer material having a reduced equilibrium torque value and an increased thermal stability time as compared to the pure polyvinyl chloride homopolymer which is used in forming the blends. Also, the polymers of the present invention provide a polymer blend which has increased toughness as compared to the toughness of the pure homopolymer used in forming the blend. The increased toughness is directly attributable to the blend in that comparisons with polyvinyl chloride homopolymers of the same equilibrium torque as the blend show that products formed from the blended polymer material are tougher than those of the pure homopolymer. The amount of the polymer of the present invention which is blended is dependent on the results desired. Generally, as little as about 25 percent by weight and as much as about 75 percent by weight based on the total weight of the blend can be used. A 50/50 blend has been found to be highly effective. The following Table V gives comparative results of toughness tests applied to conventional homopolymers and to a blend of one of the homopolymers with a polymer of the present invention. The test utilized in compiling the data is an ASTM test titled "Tensile Impact Energy to Break Plastics and Electrical Insulating Materials" which is designated D 1822-61T. Basically, a polymer sample in the shape of a dumbbell or a bone type dog biscuit is clamped to a free swinging pendulum. The other end of the sample is clamped in a crosshead clamp which is of greater width than the pendulum. An anvil composed of two blocks separated a sufficient width to allow the pendulum to pass therebetween but not the crosshead clamp is provided and is attached to a standardized tension impact machine. The energy to fracture the sample by shock in tension is determined by the kinetic energy developed at the instant the travel of the crosshead is arrested during the process of breaking the sample. The energy absorbed in the break is reported in foot-pounds per square inch of minimum cross-sectional area of the sample. Also important in this test is the manner in which the sample breaks and the number of such breaks. If the sample breaks clean with no stress whitening or elongation, it is denoted a brittle break and is indicative of the brittleness of the polymer. If the sample shows elongation and stress whitening at the break, it is denoted a ductile break and is indicative of the ductility or toughness of the polymer. If, out of 10 samples, a majority of breaks are brittle, the polymer is considered brittle and if a majority are ductile, the polymer is considered ductile. Also, the energies absorbed in breaking the sample show the toughness of the polymer in that low absorbed energy values indicate a brittle polymer and high absorbed energy values indicate a ductile or tough polymer.

radical polymerization. In other words, a branched polymer having long polymer chain branches is formed. Molecular weight determinations further support this theory. Absolute molecular weight values are obtained using light scattering photometry which is substantially unaffected by polymer structure. Other methods of obtaining molecular weight values, such as gel permeation chromatography (GPC) and solution viscosity are affected by polymer structure and these tests give relative numbers based on molecular size or hydrodynamic volume, e.g., the space occupied by the polymer molecule. These tests give apparent molecular weight. A molecule of a branched polymer of the same molecular weight as a molecule of a linear polymer would be more compact and thus have a smaller hydrodynamic volume. Theoretically, the absolute molecular weight and the apparent molecular weight of a linear polymer should be the same and the absolute molecular weight

TABLE V

| Polymer | Fusion rheometer equivalent Torque | Stability | Tensile impact | | | |
|---|---|---|---|---|---|---|
| | | | Brittle breaks | Energy absorbed | Ductile breaks | Energy absorbed |
| 1. Polymer of present invention (A) | 1,080 | 90+ | 8 | 24 | 2 | 101 |
| 2. Conventional PVC homopolymer rel. vis. 2.12 | 2,220 | 29 | 2 | 24 | 7 | 150 |
| 3. Conventional PVC homopolymer rel. vis. 1.78 | 1,500 | 43 | 7 | 20 | 2 | 122 |
| 50/50 blend of 1 and 2 | 1,560 | 52 | 0 | 0 | 10 | 133 |

NOTE.—(A) A polymer prepared in accordance with the procedure of Example 3D having a relative viscosity of 1.68.

Chemical analysis has failed to elucidate the exact structure of the polymer formed by the process of the present invention. Within the limits of experimental accuracy of the chemical analysis tests, various facts have been uncovered which give an indication as to the structure of the polymer which is formed. It is to be understood that the following data is subject to experimental error and limitation and is not to be considered absolute. The indications of structure based on the experimental analysis data are to be considered only as theory and are given only to provide a possible explanation for the results obtained by this invention.

Sulfur analysis tests indicate that substantially all of the mercapto sulfur is present in the finally prepared polymer. Titrations to detect free mercaptan groups indicate the absence of free mercaptan groups in the polymer. Because of the small quantities of polymercaptan used and the limitations of the test as to sensitivity, the absence of free mercaptan groups is not to be considered absolute. Mass spectrometry and thin layer chromatography tests did not show the presence of any unreacted polymercaptan in the polymer. Tests for disulfide linkages also proved negative. Tests were also conducted on the polymer of Example 3D which was prepared using a polymercaptan having ester carbonyl linkages to determine if the structure of the polymercaptan compound was affected during polymerization. These tests also proved negative. Since the polymercaptan used in Example 3D is based on pentaerythritol, tests were also conducted to determine whether or not the neopentyl group of the pentaerythritol remained in the polymer. A positive result was obtained in these tests. The foregoing data indicates that the polymercaptan is reacted with and incorporated into the polymer. In theory, a polymer structure is formed which has as its central moiety the residue of the polymercaptan and polymer chains extending from each sulfur atom as it is known that mercapto hydrogen atoms from a monomercaptan compound can be removed during polymerization to form a free radical at the sulfur site and hence a site for free of a branched polymer should be different from the apparent molecular weight. Therefore, the ratio of absolute to apparent molecular weight should give an indication of whether or not the polymer is branched and this ratio should allow comparison of various polymers regardless of molecular weight. The following Table VI shows the molecular weights and their ratio of a polymer prepared in accordance with Example 3D having a relative viscosity of 1.70 and those of two conventional polyvinyl chloride homopolymers. As can be seen, the ratio of absolute to apparent molecular weight is 1 for the conventional polyvinyl chloride homopolymers indicating a linear polymer whereas the ratio for the polymer of the present invention is 1.4 indicating a branched polymer.

TABLE VI

| Polymer | Relative viscosity | Absolute mol. weight by light scattering | Apparent molecular weight | | Ratio, absolute/ apparent |
|---|---|---|---|---|---|
| | | | GPC | Viscosity | |
| Polymer of present invention | 1.70 | 88 | 64 | 63 | 1.4 |
| PVC | 1.78 | 65 | 65 | 66 | 1.0 |
| PVC | 2.12 | 98 | 98 | 92 | 1.0 |

NOTE.—The above molecular weight numbers are multiplied by 1,000 to obtain actual molecular weight value.

Thus, and in theory, analytical data seems to indicate the formation of a branched polymer by the incorporation of the polymercaptan into the polymer. The foregoing is theory and applicant presents the foregoing only as a possible explanation of the results obtained in performing the process of the present invention and applicant does not intend to be bound thereby.

EXAMPLE 10

Using the aforedescribed suspension polymerization procedure, a polymer is prepared wherein the initiator is azobisisobutyronitrile, the suspending agent is hydroxymethyl cellulose and wherein 0.218 parts (0.00103 —SH equivalence per mole of monomer) of trimethylolpropane tri(3-mercaptopropionate) is used as the polymercaptan.

EXAMPLE 11

Using the suspension polymerization procedure at 60° C., a polymer is prepared wherein the initiator is t-butyl peroxypivalate, the suspending agent is gelatin and wherein 0.2 parts (0.00103 —SH equivalence per mole of monomer) of pure tetramercaptopentaerythritol is used as the polymercaptan.

EXAMPLE 12

Using the suspension polymerization procedure at 60° C., a polymer is prepared wherein the initiator is diisopropylperoxydicarbonate, the suspending agent is polyvinyl alcohol and wherein 0.06 parts (0.00063 —SH equivalence per mole of monomer) of 1,3,5-trimercaptocyclohexane is used as the polymercaptan.

EXAMPLE 13

Using the aforedescribed suspension polymerization procedure at 58° C., a polymer is prepared wherein the initiator is azobisisobutyronitrile, the suspending agent is hydroxymethyl cellulose and wherein 0.214 parts (0.0016 —SH equivalence per mole of monomer) of dipentaerythritol hexa(3mercaptopropionate) is used as the polymercaptan. A good yield of polymer having a relative viscosity of 1.87 is obtained.

EXAMPLE 14

A polymer is prepared using the aforedescribed suspension polymerization procedure at 58° C. wherein the initiator is azobisisobutyronitrile, suspending agent is hydroxymethyl cellulose and wherein 1.5 parts (0.001 —SH equivalence per mole of monomer) of polyvinyl thiol having a molecular weight of about 480 and having an average of eight mercaptan groups per molecule is used as the polymercaptan.

EXAMPLE 15

A polymer is prepared by repeating Example 12 using a reaction vessel having an inlet valve. The charge with the exception of the polymercaptan is placed in the vessel and polymerization is initiated. The polymercaptan is incrementally added through the inlet valve to the reaction vessel during the first hour of reaction.

Polymers are also prepared using the aforedescribed suspension polymerization procedure and using the following materials:
Example 16 — 0.196 parts (0.0010 -SH equivalence per mole of monomer) of N,N', N'', N'''-tetra(2-mercaptoethyl) pyromellitamide.

17 — 0.117 parts (0.0008 —SH equivalence per mole of monomer of tri(2-mercaptoethyl) nitriloacetate.

18 — 155 parts of vinylidene chloride (1.6 moles) in place of the 100 parts vinyl chloride used in Example 3D.

19 — 90 parts vinyl chloride and 15.5 parts vinylidene chloride (mole ratio 9/1) in place of the 100 parts vinyl chloride used in Example 3D.

20 — 90 parts vinyl chloride and 13.75 parts vinyl acetate (mole ratio 9/1) in place of the 100 parts vinyl chloride used in Example 3D.

21 — 80 parts vinyl chloride, 15.5 parts vinylidene chloride and 27.5 parts diethyl fumarate (mole ratio 8/1/1) in place of the 100 parts vinyl chloride used in Example 3D.

22 — 0.189 parts (0.001 —SH equivalence per mole of monomer) of xylitol penta(beta-mercaptopropionate)

Emulsion Polymerization Procedure

The reaction mixture or charge containing the monomer initiator emulsifying agent, polymercaptan and water is sealed in a 1 quart soda bottle, the bottle is immersed in a constant temperature bath and the mixture is allowed to react for 14 hours. The bottle is rotated end over end at 41 revolutions per minute to provide the agitation necessary effect emulsification. The charge consists of the following materials in amounts given in approximate parts by weight:

|  | Parts by Weight (Dry) |
|---|---|
| Vinyl Chloride | 100 |
| Deionized Water | 230 |
| Sodium Lauryl Sulfate | 2.0 |
| Potassium Persulfate | 0.1 |
| Sodium Bicarbonate | 0.05 |
| Polymercaptan | |

EXAMPLE 23

Using the emulsion polymerization procedure at 58° C., a stable latex is obtained at 100 percent monomer conversion using as polymercaptan 0.1 parts of the polymercaptan blend which is used and described in Examples 2 to 6. The latex is coagulated by drying to obtain polymer having a relative viscosity of 1.99. Replacement of the potassium persulfate/sodium bicarbonate initiator system with copper sulfate/hydrogen peroxide or potassium persulfate/potassium metabisulfite/Fe $^{++}$ initiator systems provides equal results. Other emulsifying agents such as sodium ethylhexyl sulfate and sodium di-n-hexylsulfosuccinate can be used in place of the sodium lauryl sulfate with equal facility.

Solution Polymerization Procedure

The reaction mixture or charge is sealed in a 1 quart soda bottle, the bottle is immersed in a constant temperature bath and the mixture is allowed to react for 14 hours. The bottle is rotated end over end at 41 revolutions per minute to provide agitation. The charge consists of the following materials in amounts given in approximate parts by weight:

|  | Parts by Weight (Dry) |
|---|---|
| Vinyl Chloride | 100 |
| Hexane | 200 |
| Azobisisobutyronitrile | 0.1 |
| Polymercaptan | |

EXAMPLE 24

Using the solution polymerization procedure at 58° C., a polymer is prepared using as polymercaptan 0.2 parts of the polymercaptan blend used and described in Examples 2 to 6. Polymer particles precipitate from the vinyl chloride/hexane solution as formed. Polymer particles are separated from the reaction mixture by filtration and dry to a fine white powder. Equal results can be obtained using other organosoluble initiators such as lauroyl peroxide, diisopropyl-peroxydicarbonate and t- butyl peroxypivalate in place of the azobisisobutyronitrile initiator. Also, other hydrocarbon solvent systems, such as: pentane, benzene, toluene, cyclohexanone, cyclohexane, tetrahydrofuran, dimethyl sulfoxide, dimethyl formamide and mixtures thereof can be used.

Mass or Bulk Polymerization Procedure

The reaction mixture or charge is sealed in a 1 quart soda bottle, the bottle is immersed in a constant temperature bath and the polymerization reaction is allowed to proceed for approximately 2½ hours (approximately 20 to 35 percent monomer conversion). The reaction is stopped by chilling the bottle in cold water and then dry ice followed by venting any remaining monomer. Agitation during polymerization is provided by rotating the bottle end over end at 41 revolutions per minute. The charge consists of the following materials in amounts given in approximate parts by weight:

|  | Parts by Weight (Dry) |
|---|---|
| Vinyl Chloride | 100 |
| Azobisisobutyronitrile | 0.1 |
| Polymercaptan |  |

EXAMPLE 25

Using the bulk polymerization procedure at 50° C., a polymer is prepared using 0.2 parts of the blend of polymercaptans as used and described in Examples 2 to 6. A fluffy white powder is obtained. Substitution of the azobisisobutyronitrile initiator with other organo-soluble initiators such as lauroyl peroxide, diisopropylperoxydicarbonate or t-butyl peroxypivalate provides similar results.

Using the aforedescribed emulsion, solution or bulk polymerization procedures, polymers are obtained using:

Example
- 26 — 0.109 parts (0.00053 —SH equivalence per mole of monomer) of trimethylolpropane tri(3-mercaptopropionate).
- 27 — 0.2 parts (0.00103 —SH equivalence per mole of monomer) of tetramercaptopentaerythritol.
- 28 — 0.06 parts (0.00063 —SH equivalence per mole of monomer) of 1,3,5-trimercaptocyclohexane.
- 29 — 0.214 parts (0.0016 —SH equivalence per mole of monomer) of dipentaerythritol hexa(3-mercaptopropionate).
- 30 — 1.5 parts (0.001 —SH equivalence per mole of monomer of polyvinyl thiol having a molecular weight of about 480 and an average of about eight mercaptan groups per molecule.
- 31 — 0.196 parts (0.0010 —SH equivalence per mole of monomer of N,N', N'', N'''-tetra(2-mercaptoethyl) pyromellitamide.
- 32 — 0.117 parts (0.0008 —SH equivalence per mole of monomer) of tri(2-mercaptoethyl) nitriloacetate.
- 33 — 155 parts of vinylidene chloride (1.6 moles) in place of the 100 parts vinyl chloride using the polymercaptan described in Example 3D.
- 34 — 90 parts vinyl chloride and 15.5 parts vinylidene chloride (mole ratio 9/1) in place of the 100 parts vinyl chloride using the polymercaptan described in Example 3D.
- 35 — 80 parts vinyl chloride, 15.5 parts vinylidene chloride and 27.5 parts diethyl fumarate (mole ratio 8/1/1) in place of the 100 parts vinyl chloride using the polymercaptan described in Example 3D.
- 36 — 90 parts vinyl chloride and 13.75 parts vinyl acetate (mole ratio 9/1) in place of the 100 parts vinyl chloride using the polymercaptan described in Example 3D.
- 37 — 0.189 parts (0.001 —SH equivalence per mole of monomer) of xylitol penta(beta-mercaptopropionate).
- 38 — 80 parts vinyl chloride and 41.5 parts monomethyl maleate (8/2 mole ratio) in place of the 100 parts vinyl chloride using the polymercaptan described in Example 3D.
- 39 — 90 parts vinyl chloride and 16 parts ethyl acrylate (9/1 mole ratio) in place of the 100 parts vinyl chloride using the polymercaptan described in Example 3D.
- 40 — 90 parts vinyl chloride and 8.5 parts acrylonitrile (9/1 mole ratio) in place of the 100 parts vinyl chloride using the polymercaptan described in Example 3D.
- 41 — 90 parts vinyl chloride and 11.5 parts vinyl ethyl ether (9/1 mole ratio) using the polymercaptan described in Example 3D.

The foregoing examples have illustrated the method of the present invention using vinyl chloride and vinylidene chloride as the vinyl halide monomer. Other vinyl halide monomers such as vinyl bromide, vinyl iodide, vinylidene bromide, vinylidene iodide and mixtures thereof can be substituted for the vinyl chloride with equal facility. Vinyl fluoride and vinylidene fluoride which have very low vapor pressures can also be used in high pressure polymerization vessels.

Various copolymers and terpolymers using non-vinyl halide type monomers in combination with the vinyl halide monomer has also been illustrated. Any other non-vinyl halide monomer such as those listed heretofore can be substituted with equal facility to prepare copolymers and terpolymers.

The polymers prepared in accordance with the present invention can be used in applications such as the preparation of calendered film, blow molded bottles, estruded flat bed and blown film, extruded articles, tubing, in injection molding, fluidized bed coating, electrostatic powder spraying, rotational casting, foamed back vinyl flooring as a plastisol replacement, as a fabric coating, as a paper impregnating solution, as metallic surface coating solutions, additives to other polymers to increase toughness of the resulting blend or wherever polyvinyl chloride is presently used. It is understood that the polymers of the invention and their solvent solutions can be compounded with additives usually employed in the coating, impregnating and molding composition arts.

Thus, and in accordance with the present invention, there is provided a method for the preparation of a new class of vinyl halide polymers which exhibit improved processing characteristics, improved thermal stability without sacrificing physical properties and which polymers provide unexpected advantages when used in the formation of solution coating compositions and when blended with other polymer materials.

What is claimed is:

1. An improved vinyl halide polymer composition comprising from about 25 percent to about 75 percent by weight of a first vinyl halide polymer prepared by the free radical polymerization of an ethylenically unsaturated monomer composition containing more than 90 percent by weight based on the total weight of said monomer composition of vinyl halide of the formula:

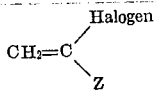

wherein Z is hydrogen or halogen and less than 10 percent of another ethylenically unsaturated comonomer copolymerizable therewith in the presence of an aliphatic polymercaptan compound having at least three mercaptan groups per molecule wherein the mercaptan group is attached to the remainder of the molecule by means of aliphatic carbon of the formula:

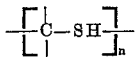

the free bonds of the carbon atom being attached to aliphatic, aromatic or inorganic moieties and $n$ being an integer of at least 3, said polymercaptan compound being present during polymerization in an amount based on —SH equivalence of from 0.00015 to about 0.05 equivalence —SH per mole of monomer in said monomer composition, and from about 75 percent to about 25 percent by weight of a second polyvinyl halide polymer not prepared in the presence of the aforesaid polymercaptan.

2. The vinyl polymer composition as recited in claim 1 wherein said vinyl halide forming said first polymer is selected from the group consisting of vinyl chloride, vinylidene chloride and mixtures of vinyl chloride and vinylidene chloride.

3. The vinyl halide polymer composition as recited in claim 1 wherein said monomer forming said first polymer consists of 100 percent vinyl halide monomer.

4. The vinyl halide polymer composition as recited in claim 3 wherein said vinyl halide monomer forming said first polymer is vinyl chloride.

5. The vinyl halide polymer composition as recited in claim 1 wherein said comonomer is selected from the group consisting of mono-olefinic hydrocarbons; diolefinic hydrocarbons, styrenes, halosubstituted styrenes, monoethylenically unsaturated mono and dicarboxylic acids including their esters, amides, nitriles and halosubstituted derivatives; and monovinyl ethers, divinyl ethers and their thio ethers.

6. The vinyl halide polymer composition as recited in claim 1 wherein said polymercaptan compound has from three to five mercaptan groups per molecule.

7. The vinyl halide polymer composition as recited in claim 1 wherein said polymercaptan is a low molecular weight polymeric polymercaptan material having a molecular weight of up to about 3,000, and at least three mercaptan groups per molecule.

8. The vinyl halide polymer compositions as recited in claim 1 wherein said polymercaptan is selected from the group consisting of pentaerythritol tetra-(3-mercaptopropionate); pentaerythritol tri(3-mercaptopropionate); pentaerythritol tetrathioglycolate; trimethylolethane tri (3-mercaptopropionate); trimethylolethane trithioglycolate; trimethylolpropane tri (3-mercaptopropionate); trimethylolpropane trithioglycolate; and mixtures thereof.

9. The vinyl halide polymer composition as recited in claim 1 wherein said polymercaptan is used in an amount of from about 0.00015 to about 0.005 equivalence —SH per mole of monomer in said monomer composition for said first polymer.

10. The vinyl halide polymer composition as recited in claim 1 wherein said polymercaptan is used in an amount of from about 0.0003 to about 0.002 equivalence —SH per mole of monomer in said monomer composition for said first polymer.

11. The vinyl halide polymer composition as recited in claim 1 wherein said free radical polymerization is conducted using suspension polymerization techniques.

12. The vinyl halide polymer composition as recited in claim 1 wherein said second polymer is a polyvinyl chloride homopolymer.

13. The vinyl halide polymer composition as recited in claim 12 wherein the said composition consists of about 50 percent by weight vinyl halide polymer and about 50 percent polyvinyl chloride homopolymer.

* * * * *